US 6,741,786 B2

(12) United States Patent
Flower et al.

(10) Patent No.: US 6,741,786 B2
(45) Date of Patent: May 25, 2004

(54) OPTICAL FIBER HOLDER WITH FIBER ENGAGING PROTRUSIONS, AND ASSOCIATED METHODS

(75) Inventors: John T. Flower, Longmont, CO (US); Joseph G. Long, Bozeman, MT (US); Jeffrey V. Meuli, Belgrade, MT (US)

(73) Assignee: ILX Lightwave Corporation, Bozeman, MT (US)

( * ) Notice: Subject to any disclaimer, the term of this patent is extended or adjusted under 35 U.S.C. 154(b) by 0 days.

(21) Appl. No.: 10/097,424

(22) Filed: Mar. 14, 2002

(65) Prior Publication Data

US 2002/0131753 A1 Sep. 19, 2002

Related U.S. Application Data

(60) Provisional application No. 60/276,804, filed on Mar. 16, 2001.

(51) Int. Cl.[7] .................................................. G02B 6/00
(52) U.S. Cl. ........................................ 385/137; 385/81
(58) Field of Search ................................. 385/137, 139, 385/138, 77, 81

(56) References Cited

U.S. PATENT DOCUMENTS

| | | | | |
|---|---|---|---|---|
| 4,179,186 A | * | 12/1979 | Tynes | ........................ 385/98 |
| 4,276,113 A | | 6/1981 | Carlsen et al. | |
| 4,756,518 A | | 7/1988 | Varin et al. | |
| 4,784,456 A | | 11/1988 | Smith | |
| 5,371,820 A | * | 12/1994 | Welbourn et al. | ............. 385/76 |
| 5,513,295 A | | 4/1996 | Go | |
| 5,574,811 A | * | 11/1996 | Bricheno et al. | ............... 385/52 |
| 5,602,951 A | * | 2/1997 | Shiota et al. | .................. 385/81 |
| 5,818,993 A | * | 10/1998 | Chudoba et al. | .............. 385/81 |
| 6,249,635 B1 | | 6/2001 | Daoud | |

OTHER PUBLICATIONS

BF–820 Bare Fiber Holder, ILX Lighwave, Rev May 2, 2001.*
Newport Model 818–IS–1 Universal Fiber Optic Detector and accessory bare fiber holder, available online at: <http://www.newport.com/file_store/PDFs/tempPDFs/Model_818IS1_Universal2883.pdf> in Apr., 2002.
Agilent Model 81000BA Bare Fiber Adapter, available online at: <http://www.agilent.com/cm/rdmfg/oct/faqs/accessories/adapters.shtml> in Apr., 2002.

* cited by examiner

Primary Examiner—Hae Moon Hyeon
(74) Attorney, Agent, or Firm—Curtis A. Vock; Lathrop & Gage

(57) ABSTRACT

The invention is directed to an optical fiber holder apparatus for aligning and positioning an optical fiber such that a user can perform various testing and manipulation of the fiber. The apparatus comprises first and second sides coupled together along a common axis, each having a face containing a plurality of fiber engaging protrusions extending along the face. The fiber engaging protrusions of each side have a longitudinal groove formed therein for accepting an optical fiber. To capture and correctly position the fiber, the first and second sides are coupled together such that the fiber engaging protrusions of each side are interleaved with each other to gradually and repeatedly move an optical fiber placed therein towards the longitudinal groove of each side as the sides are rotated together in a mating relationship. The gradual movement of the optical fiber is facilitated by the broad angle presented between the interleaved fiber engaging protrusions of the first and second side and the relatively large dimensions of the protrusions relative to the fiber diameter.

34 Claims, 4 Drawing Sheets

OPTICAL FIBER HOLDER WITH FIBER ENGAGING PROTRUSIONS, AND ASSOCIATED METHODS

RELATED APPLICATIONS

This application claims priority to U.S. provisional application serial No. 60/276,804, filed on Mar. 16, 2001 and is incorporated herein by reference.

BACKGROUND OF THE INVENTION

This invention relates generally to devices for managing optical fiber and, more particularly, to an apparatus for correctly positioning and holding optical fiber to facilitate accurate fiber performance measurement or other processing.

DESCRIPTION OF THE RELATED ART

In the manufacture and usage of optical fibers, there is frequently a need to secure a section of fiber for performing sub-assembly steps or other functions, such as fiber performance testing. For example, it is often necessary to measure the light output of a cleaved bare optical fiber by use of power meters and other instruments. The position of the optical fiber in the x-y plane must essentially be fixed to allow the operator to manipulate the fiber as necessary. At the same time, the fiber must not be subjected to undue stresses which could distort the accuracy of performance measurements taken or destroy the integrity of the fiber structure.

Devices used to hold and manipulate an optical fiber are known. For example, NEWPORT™ Model 818-IS-1 is a clamshell-like device used to hold optical fibers and is configured to be attached to a fiber optic detector for performance measurements. AGILENT™ Model 81000BA is a V-shaped clamping device that holds optical fibers by having a user place a fiber through the a V-section and into an internal track.

There are, however, several problems with known optical fiber holders exemplified in the above-listed devices: first, it is difficult and tedious to insert and align optical fibers within these devices; second, breakage occurs if a fiber is incorrectly located; third, fiber misplacement within these devices alters and distorts the performance of the fiber—making these devices unsuitable for consistent optical measurement, testing and manufacturing.

Another problem with known optical fiber holders is the use of conductive materials to form the holder. An insulating pressure pad must be used with these types of holders, which generates static charges that can misalign the fiber in certain circumstances.

Thus, there is a need for an easy-to-use optical fiber holder apparatus that provides consistent results when holding and manipulating the optical fiber. Such an apparatus should align and position an optical fiber extending therethrough for measurement and/or other processing by a user. Further, the apparatus should achieve these effects by gradually urging an inexactly placed fiber into correct position while maintaining the integrity and structural soundness of the fiber.

SUMMARY OF THE INVENTION

It is therefore one feature of the invention to provide an optical fiber holder apparatus that gently and repeatedly captures an optical fiber for manipulation and/or positioning during optical testing, measurement and manufacturing sub-assembly steps. It is another feature of the invention to provide one fiber holder apparatus that can be opened with one hand for placement of an optical fiber therein and releasably closed to accurately position the optical fiber. It is a further feature of the invention to provide one fiber holder apparatus configured to close around an optical fiber as to fix the x and y position orthogonal to the fiber length of a section of the fiber. It is still a further feature of the invention to provide one fiber holder apparatus that allows for inexact placement by a user of the optical fiber within the holder without distorting or damaging the fiber upon closure. It is yet another feature of the invention to provide one fiber holder apparatus that is configured to block ambient light from interfering with optical measurements of the held optical fiber. It is yet another feature of the invention to provide one fiber holder apparatus that is inexpensive, simple to operate, reduces user fatigue, requires minimal moving parts, is neat in appearance, and is particularly well suited for the proposed usages thereof.

One optical fiber holder apparatus aligns and positions an optical fiber such that a user may perform various testing and manipulation of a section of the fiber. The apparatus includes first and second sides coupled together along a common axis, each having a face containing a plurality of fiber engaging protrusions extending along the face. The fiber engaging protrusions of each side have a longitudinal groove formed therein for accepting an optical fiber. To capture and correctly position the fiber, the first and second sides are coupled together such that the fiber engaging protrusions of each side are interleaved with each other to gradually and repeatedly move an optical fiber placed therebetween towards the longitudinal groove of each side as the sides are rotated together in a mating relationship. In one respect, the gradual movement of the optical fiber is facilitated by a broad transverse angle presented between the interleaved fiber engaging protrusions of the first and second side and the relatively large dimensions of the protrusions relative to the fiber diameter.

In another aspect, the fiber holder apparatus may be opened for accepting an optical fiber by applying a force to flanges connected to each of the first and second sides, to bring the flanges together and rotate the faces of the first and second sides away from each other; this presents an opening between the fiber engaging protrusions of each side into which a section of optical fiber is placed. The force applied to the flanges is then released to allow for the first and second sides to rotate towards one another into a closed state and the fiber engaging protrusions of each side to more fully interleave. As this rotation takes place, the intersection point of the fiber engaging protrusions of each side moves upward, pushing the section of fiber therein towards the longitudinal groove of each side. Further, the rotation towards the closed state enables the longitudinal grooves to form a single groove to accurately align and position the section of fiber placed within the apparatus. When the holder apparatus reaches the fully closed position, the x and y position orthogonal to the fiber length of a section of the fiber becomes substantially fixed in position.

The invention of another aspect provides a fiber optic holder apparatus that is simple to operate and accurately aligns optical fiber inexactly placed within the apparatus. Fiber engaging protrusions and longitudinal grooves are configured to guide the optical fiber into position without distorting or damaging the fiber. These protrusions may be configured to have large overall dimensions relative to the diameter of the optical fiber, making it less tedious to place a section of fiber within the apparatus.

Other advantages and components of the invention are apparent from the following description taken in conjunction with the accompanying drawings, which constitute a part of this specification and wherein are set forth exemplary embodiments of the present invention to illustrate various features thereof.

DETAILED DESCRIPTION OF THE INVENTION

An optical fiber holder apparatus 10 of the present invention is shown generally in FIGS. 1–7. The apparatus 10 comprises a main body section 12 and a nose section 14 each divided symmetrically in half into first and second sides 16a, 16b revealing a first and second plurality of fiber engaging protrusions 18a, 18b, respectively. These fiber engaging protrusions 18a, 18b work together to repeatedly capture and properly align a section of optical fiber 20 placed therebetween to facilitate accurate and consistent positioning, testing, and/or manipulation of the fiber during, for example, manufacturing subassembly steps, without inducing micro-damage to the fiber 20.

The first and second sides 16a, 16b of the apparatus 10 can be made from a variety of materials, including plastics, fiberglass reinforced plastics, and other composite or partially metallic materials that can be molded or formed into a single unitary member. Preferably, the sides 16a, 16b are made of about 20% glass-filled polycarbonate, a moldable material that is somewhat conductive, optically opaque and dimensionally stable. The conductivity of the glass-filled polycarbonate prevents the apparatus 10 from having a static attraction to the optical fiber 20, which could inhibit proper alignment of the fiber section. The optically opaque nature of the apparatus 10 reduces ambient room light from interfering with output measurement of the optical fiber 20.

Figure 1:
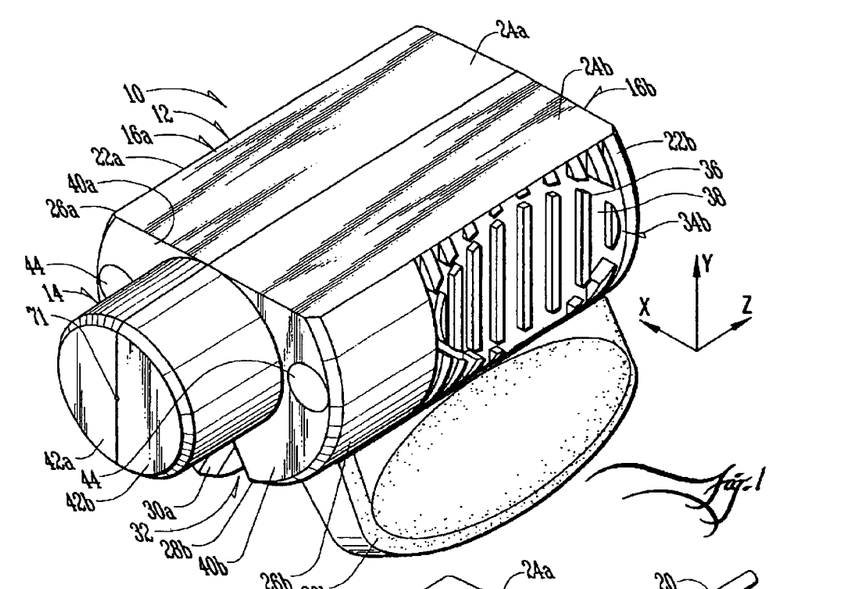
FIG. 1 is a right side perspective view of the optical fiber holder apparatus of the present invention showing the apparatus in the closed state.
Figure 2:
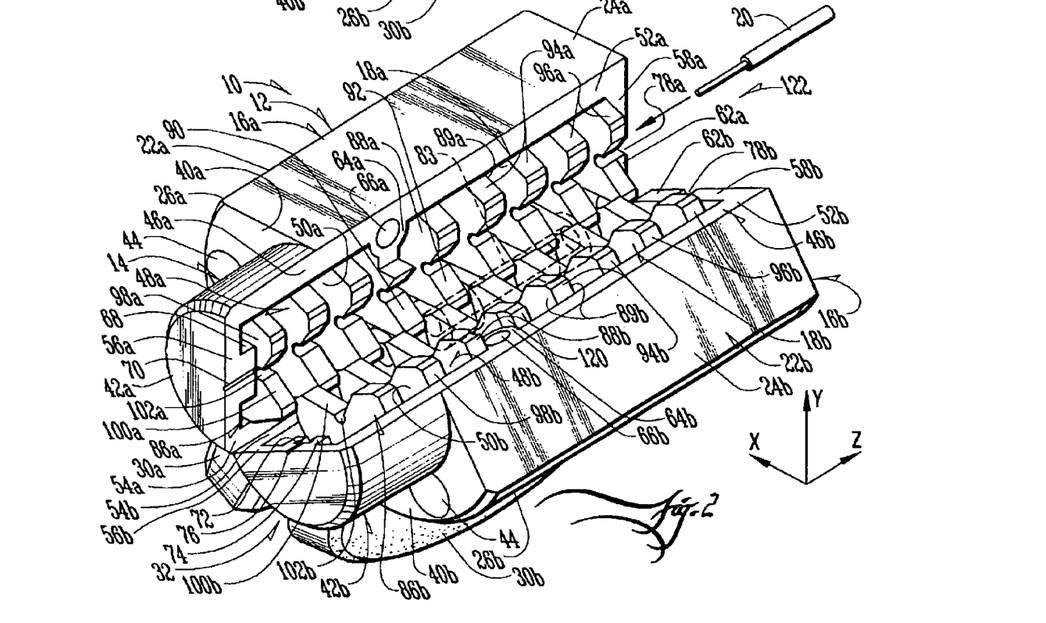
FIG. 2 is a perspective view of the optical fiber holder apparatus of FIG. 1 showing the apparatus in the open state.
Figure 5:
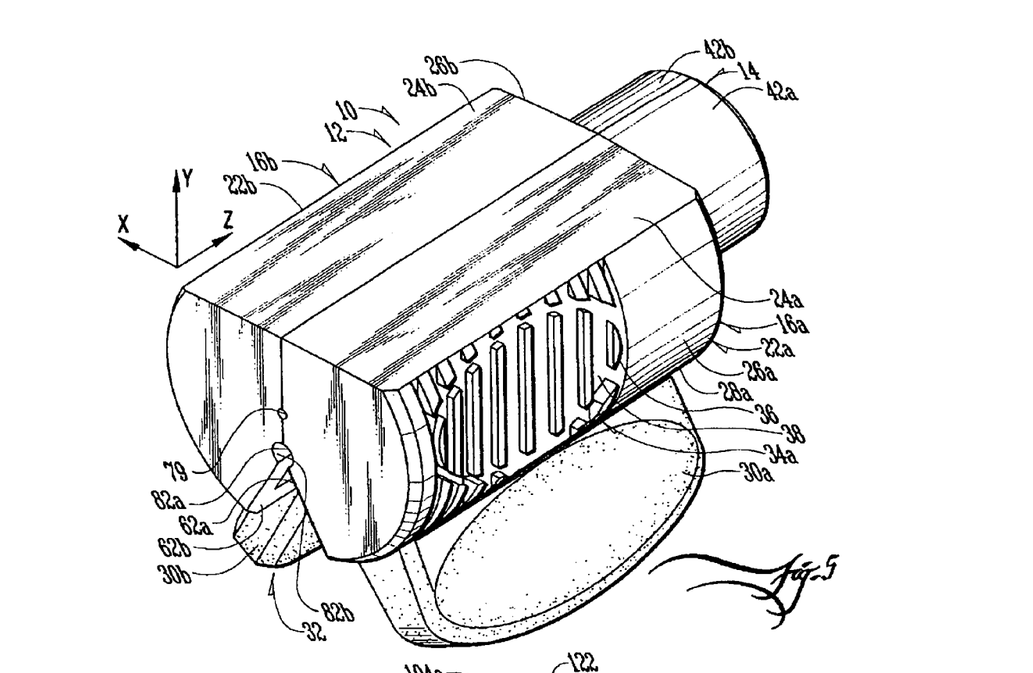
FIG. 5 is a left side perspective view of the optical fiber holder apparatus of FIG. 1 showing the apparatus in the closed state.
Figure 6:
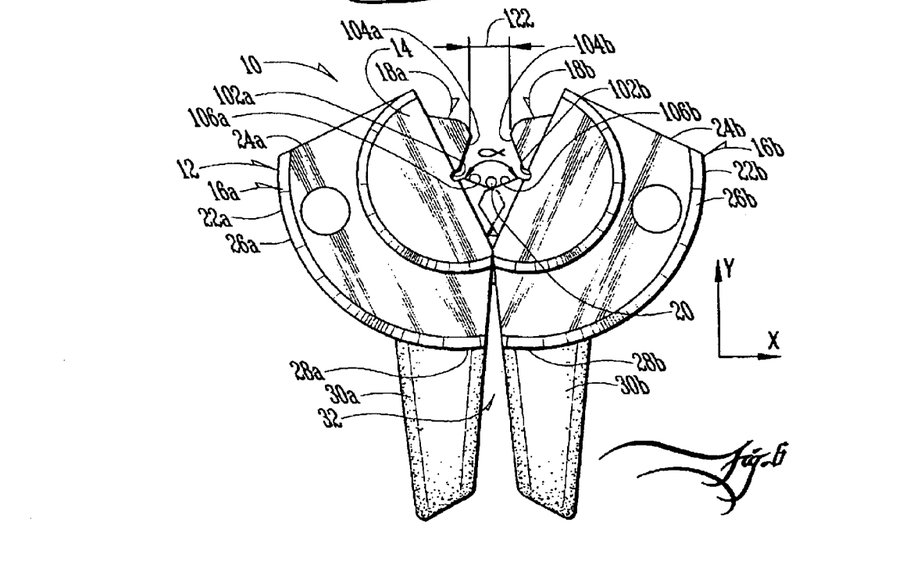
FIG. 6 is a front elevational close-up view of a set of fiber engaging protrusions of the apparatus positioned in the open state.

The first and second sides 16a, 16b each present exterior shells 22a, 22b that may be symmetrical mirror images of one another, as seen in FIGS. 1 and 5. These exterior shells 22a, 22b have planar top faces 24a, 24b that span the length of the main body section 12. Rounded sidewalls 26a, 26b extend generally downward from the top surfaces 24a, 24b and terminate at lower edges 28a, 28b to which flanges 30a, 30b are attached. The flanges 30a, 30b may be configured to have a covering made from a material softer and more pliable that the material forming the first and second sides 16a, 16b. For example, this flange covering material can be made from rubber or other synthetics to aid the user's grip of their fingers on the flanges 30a, 30b. A generally triangularly-shaped gap 32 is defined between the lower edges 28a, 28b and flanges 30a, 30b of the first and second sides 16a, 16b. This gap 32 allows the flanges 30a, 30b to be brought together to rotate either or both of the first and second sides 16a, 16b, about a common longitudinal pivot axis extending in the z-axis direction and position the apparatus 10 in an open state for accepting optical fiber 20 therein, as seen in FIGS. 2 and 6. Additionally, the sidewalls 26a, 26b may have gripping areas 34a, 34b comprised of a series of alternating ridges 36 and grooves 38. These gripping areas 34a, 34b are sized and configured such that a user may apply a force to the gripping areas with their fingers to securely hold the apparatus 10 therebetween and/or to extract the apparatus 10 from an optical measurement device (not shown). Front faces 40a, 40b are also disposed on the shells 22a, 22b and have half-cylindrical shaped nose members 42a, 42b extending therefrom The nose members 42a, 42b together form the exterior shell of the nose section 14, which is configured to have a smaller transverse dimension in the x-y plane than the main body section 12. In this way, the nose members 42a, 42b are configured to be matingly received by an optical measurement device for analyzing the output of captured optical fiber 20. To assist in securing the apparatus 10 to the optical measurement device, a set of magnetic elements 44 can be affixed to the front faces 40a, 40b to magnetically couple the apparatus to magnetic or metallic elements of the measurement device.

Figure 3:
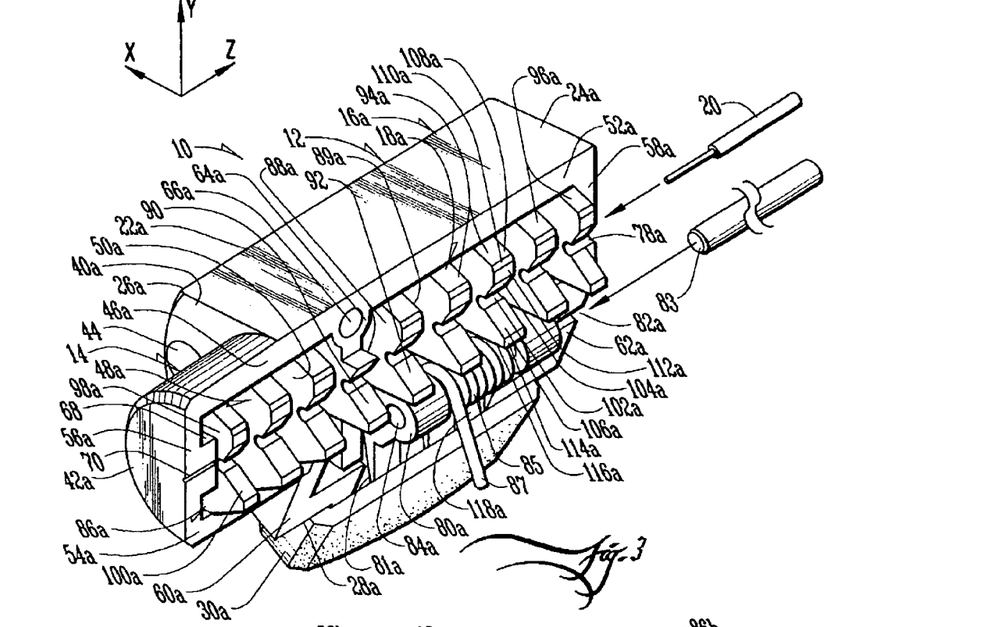
FIG. 3 is a perspective view of the first side of the optical fiber holder apparatus of FIG. 1 showing surfaces for engaging optical fiber.
Figure 4:
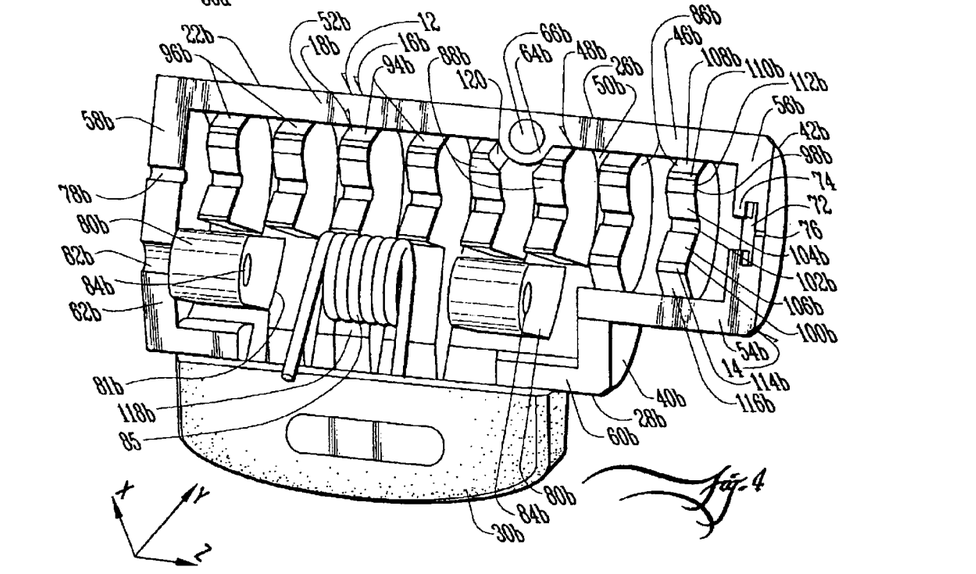
FIG. 4 is a perspective view of the second side of the optical fiber holder apparatus FIG. 1 showing surfaces for engaging optical fiber.

Moving to the interior parts of the apparatus 10, FIGS. 3 and 4 depict the components of the first side 16a and the second side 16b, respectively. The first and second sides 16a, 16b have first and second faces 46a, 46b presenting generally flat sections extending substantially around the perimeter of interior regions 48a, 48b. The interior regions 48a, 48b are formed to house the first and second plurality of fiber engaging protrusions 18a, 18b alternately, adjacently positioned with respect to a first and second plurality of transverse slots 50a, 50b.

The first and second faces 46a, 46b are comprised of upper longitudinal surfaces 52a, 52b, lower longitudinal surfaces 54a, 54b, forward transverse surfaces 56a, 56b, rearward transverse surfaces, 58a, 58b, forward abutting surfaces 60a, 60b, and rearward abutting surfaces 62a, 62b. The upper longitudinal surfaces 52a, 52b span the length of the apparatus 10 and are generally rectangularly-shaped. Optionally, curved extensions 64a, 64b are formed on the upper longitudinal surfaces 52a, 52b upon which magnetic elements 66a, 66b can be affixed. When the apparatus 10 is positioned in the closed state, the magnetic element 66a of the first face 46a is magnetically coupled with the magnetic element 66b of the second face 46b to assist in maintaining the closed state.

The forward transverse surfaces 56a, 56b and rearward transverse surfaces 58a, 58b extend downward from the upper longitudinal surfaces 52a, 52b and are generally rectangularly-shaped similar to the surfaces 52a, 52b. The forward transverse surface 56a of the first side 16a has an extension 68 disposed in the forwardmost transverse slot 50a and an exit groove 70 extending longitudinally across the surface 56a and preferably configured to accept bare optical fiber 20. The forward transverse surface 56b of the second side 16b has a notch 72 extending into the interior region 48b and flanges 74 extending across the notch 72, as seen in FIG. 4. An exit groove 76 extends longitudinally across the forward transverse surface 56b and, like the groove 70, is configured to accept bare optical fiber 20. In this way, the grooves 70, 76 of the first and second sides 16a, 16b form a bore 71 to surround a section of the optical fiber 20 placed within the apparatus 10 positioned in the closed state such that the fiber section is held in place and prevented from moving transversely in the x-axis and vertically in the y-axis. The section of fiber extending outward from the bore 71 can then be manipulated and/or processed by a user. On the longitudinally opposite end of the apparatus 10 from the forward transverse surfaces 56a, 56b are the rearward transverse surfaces 58a, 58b. Each of the rearward transverse surfaces 58a, 58b are essentially identical and have entrance grooves 78a, 78b extending longitudinally across the surfaces 58a, 58b. These entrance grooves 78a, 78b are longitudinally aligned with the exit grooves 70, 76 and preferably are configured to accept sheathed optical fiber 20. Similar to the exit grooves 70, 76, the entrance grooves 78a, 78b form a bore 79 to surround a section of the optical fiber 20 placed within the apparatus 10 positioned in the closed state such that the fiber section is held in place and prevented from moving transversely in the x-axis and vertically in the y-axis. Because the entrance grooves 78a, 78b surround sheathed optical fiber 20, these grooves form the bore 79 with a larger diameter than the bore 71. It should also be noted that the upper longitudinal surface 52a, the forward transverse surface 56a, and rearward transverse surface 58a of the first side 16a are aligned in a mating relationship with the upper longitudinal surface 52b, the forward transverse surface 56b, and rearward transverse surface 58b of the second side 16b when the apparatus 10 is positioned in the closed state.

The rectangularly-shaped lower longitudinal surfaces 54a, 54b extend rearwardly from the forward transverse surfaces 56a, 56b and underlie a number of the first and second plurality of fiber engaging protrusions 18a, 18b. Because the surfaces 54a, 54b define a lower interior area for the nose section 14, the number of protrusion 18a, 18b that the surfaces 54a, 54b underlie will depend on the length of the nose section desired. Preferably, the surfaces 54a, 54b underlie at least two of the protrusions 18a, 18b of each of the first and second sides 16a, 16b.

Moving downward from the lower longitudinal surfaces 54a, 54b and the rearward transverse surfaces 58a, 58b, the L-shaped forward abutting surfaces 60a, 60b and rearward abutting surfaces 62a, 62b, respectively, are encountered. The forward and rearward abutting surfaces 60a, 62a of the first side 16a are disposed adjacent to a first set of pivot axis retainers 80a, and the forward and rearward abutting surfaces 60b, 62b of the second side 16b are disposed adjacent to, and partially underlying, a second set of pivot axis retainers 80b. Also, the forward and rearward abutting surfaces 60a, 60b, 62a, 62b extend downward to intersect with the lower edges 28a, 28b of the rounded exterior sidewalls 26a, 26b. Thus, in this configuration, the forward and rearward abutting surfaces 60a, 62a of the first side 16a abut and mate with the forward and rearward abutting surfaces 60b, 62b of the second side 16b when the apparatus 10 is positioned in the open state and the flanges 30a, 30b are brought together.

The pivot axis retainers 80a, 80b extend outward from curved base surfaces 81a, 81b of the interior regions 48a, 48b, such surfaces 81a, 81b generally following the shape of the rounded exterior sidewalls 26a, 26b. The retainers 80a of the first side 16a are sized to be received within the interior region 48b of the second side 16b and the retainers 80b of the second side 16b are sized to be received within the interior region 48a of the first side 16a in an overlapping relationship. This permits the pivot axis retainers 80a, 80b to hold an axis pin 83, such as a hollow cylindrical member, to couple the first and second sides 16a, 16b of the apparatus 10 together. Further, axis pin grooves 82a, 82b extends longitudinally across the first and second faces 46a, 46b between the rearward transverse surfaces, 58a, 58b and the rearward abutting surfaces 62a, 62b. These axis pin grooves 82a, 82b are longitudinally aligned with bores 84a, 84b of the pivot axis retainers 80a, 80b such that the axis pin 83 can be inserted through the grooves and into the bores when the first and second sides 16a, 16b are positioned adjacent to one another such that the retainers are arranged in a longitudinally overlapping relationship, as seen in ghost lines in FIG. 2. In this way, the axis pin grooves 82a, 82b of the first and second sides 16a, 16b together form a bore configured to surround the axis pin 83. Such axis pin 83 preferably has an outer diameter of about the same size as the diameter of the pivot axis retainer bores 84a, 84b such that it is friction fit therein. Also, the length of the axis pin 83 should span the longitudinal dimension from the axis pin grooves 82a, 82b to the forward most pivot axis retainer 80b of the second side 16b. Further, a biasing element 85, such as a torsion spring, is provided to bias the apparatus 10 into the closed state to maintain the position of the optical fiber 20 placed therein. The biasing element 85 is preferably positioned around the pivot axis pin 83 and between the pivot axis retainers 80a, 80b. In this arrangement, spring arms 87 extending from the element contact the interior regions 48a, 48b of the first and second sides 16a, 16b below the pivot axis to urge the first and second side faces 46a, 46b together and move the apparatus 10 into the closed state.

Figure 7:
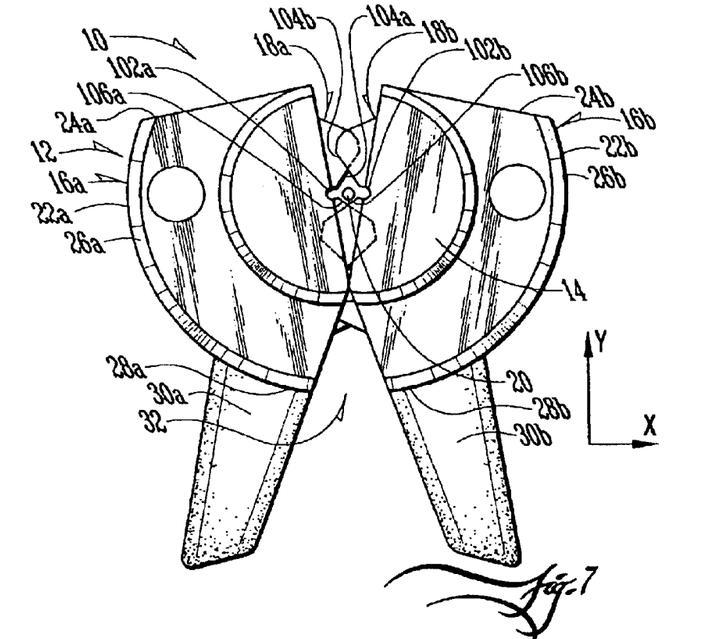
FIG. 7 is a front elevational close-up view of a set of fiber engaging protrusions when the apparatus is rotating towards the closed state.
Figure 8:
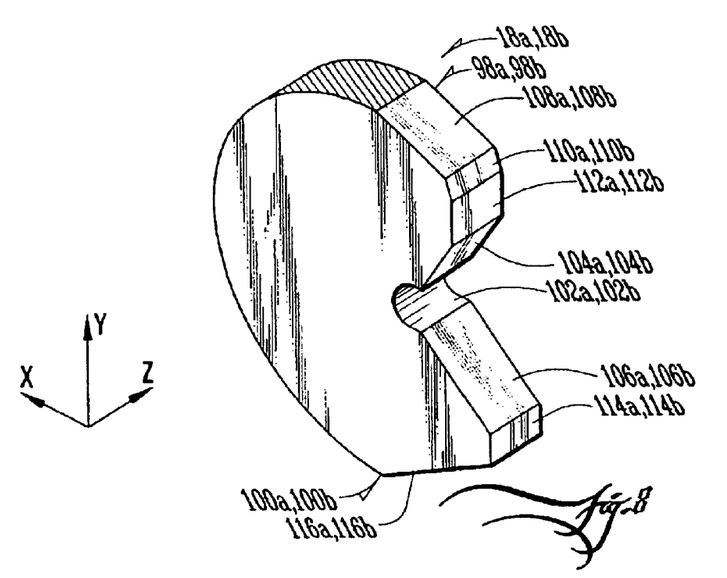
FIG. 8 is a perspective close-up view of one of the fiber engaging protrusions.

Spanning across the interior regions 48a, 48b of the first and second sides 16a, 16b, respectively, are the first and second plurality of fiber engaging protrusions 18a, 18b and the first and second plurality of transverse slots 50a, 50b, best seen in FIGS. 3 and 4. These protrusions 18a, 18b and slots 50a, 50b have a height extending along the y-axis, a depth extending along the x-axis, and a generally uniform width extending longitudinally along the z-axis. Each protrusion 18a, 18b has opposed side faces 89a, 89b that, along with the curved base surfaces 81a, 81b, form each of the slots 50a, 50b. Also, the protrusions 18a, 18b extend outwardly from the curved base surfaces 81a, 81b and are generally disposed immediately below the upper longitudinal surfaces 52a, 52b. Because it is desired for the fiber engaging protrusions 18a, 18b of each side of the apparatus 10 to repeatedly and accurately guide an optical fiber 20 section, the protrusions of the first side 16a are longitudinally offset by the width of one protrusion from the protrusions of the second side 16b. In this way, when the first and second sides 16a, 16b are coupled together along the pivot axis, the protrusions 18a of the first side are received into the slots 50b of the second side 16b and the protrusions 18b of the second side are received into the slots 50a of the first side 16a as the apparatus 10 moves towards the closed state. This alternating, interleaving protrusion configuration is best seen in FIGS. 2, 6, and 7.

A first set 86a, 86b of fiber engaging protrusions 18a, 18b have a height extending from the upper longitudinal surfaces 52a, 52b to the lower longitudinal surfaces 54a, 54b. Moving rearward of the first set 86a, 86b is the second set 88a, 88b of fiber engaging protrusions 18a, 18b. The second set 88a of fiber engaging protrusions 18a of the first side 16a is comprised of a first protrusion 90 having a height extending from the upper longitudinal surface 52a and the curved extension 64a substantially to the forward abutting surface 60a and a second protrusion 92 having a height extending from the upper longitudinal surface 52a to a position adjacent to and generally above where the pivot axis retainers 80a are positioned. Contrastingly, the second set 88b of fiber engaging protrusions 18b of the second side 16b have a height extending from the upper longitudinal surface 52b and the curved extension 64b to a position adjacent to and generally above where the pivot axis retainers 80b are positioned. A third set 94a, 94b of fiber engaging protrusions 18a, 18b are located rearward of the second set 88a and have a height extending from the upper longitudinal surfaces 52a, 52b substantially to the flanges 30a, 30b. Finally, a fourth set 96a, 96b of fiber engaging protrusions 18a, 18b have a height extending from the upper longitudinal surfaces 52a, 52b to a position adjacent to and generally above where the pivot axis retainers 80a, 80b are positioned.

Describing the fiber engaging protrusions 18a, 18b in more detail, and best seen in FIGS. 2–4 and 8, each protrusion has upper tooth-like members 98a, 98b and lower tooth-like members 100a, 100b extending outward beyond the plane of the first and second faces 46a, 46b, as well as a semi-circular longitudinal groove 102a, 102b formed between the upper members 98a, 98b and the lower members 100a, 100b. Preferably, the upper members 98a, 98b, lower members 100a, 100b, and longitudinal grooves 102a, 102b of each protrusion 18a, 18b combine to form a generally v-shaped receiving area for the optical fiber 20. Each of the upper members 98a, 98b has at least a flat, upper fiber manipulation surface 104a, 104b and each of the lower members 100a, 100b has at least a flat, lower fiber manipulation surface 106a, 106b. Preferably, except for the first protrusion 90 of the second set 88a of fiber engaging protrusions 18a, each protrusion 18a, 18b has the following shown in detail in FIG. 8: an upper member 98a, 98b having an upper shoulder 108a, 108b, a blunt edge 110a, 110b, a tip 112a, 112b, and the upper fiber manipulation surfaces 104a, 104b; a lower member 100a, 100b having a lower fiber manipulation surface 106a, 106b, a tip 114a, 114b, and a lower shoulder 116a, 116b; and the longitudinal groove 102a, 102b. Further, each of the third set 94a, 94b of fiber engaging protrusions 18a, 18b has a flat shoulder 118a, 118b extending substantially to the flanges 30a, 30b and configured to abut the biasing element 85. The first protrusion 90 of the second set 88a of fiber engaging protrusions 18a differs from the rest of the protrusions by eliminating the blunt edge 110a and tip 112a to allow space for the magnetic element 66a positioned above to come into contact with the magnetic element 66b when the apparatus 10 is in the closed state. Similarly, the second set 88b of fiber engaging protrusions 18b of the second side 16b have curved shoulders 120 to allow space for the magnetic element 66b positioned above to come into contact with the magnetic element 66a.

Preferably, the fiber engaging protrusions 18a, 18b have relatively large dimensions as compared to the diameter of the optical fiber 20 such that an user can imprecisely position the fiber between the protrusions and still expect the apparatus 10 to properly align the fiber section. As an example, when aligning bare optical fiber 20, the upper members 98a, 98b and lower members 100a, 100b should have an x-axis dimension measured above the plane of the first and second faces 46a, 46b of about 3/32 of an inch or larger. Also, the preferred y-axis dimension spanned by the upper fiber manipulation surface 104a, 104b, the lower fiber manipulation surface 106a, 106b, and the longitudinal groove 102a, 102b of each protrusion 18a, 18b should be at least 3/16 of an inch or larger. Further, the longitudinal grooves 102a, 102b should have a diameter at least as big as the optical fiber 20 diameter. Preferably, the grooves 102a, 102b are also sized to receive a conductive compression pad (not shown) therein to reduce static buildup along the optical fiber 20, which could interfere with testing. Such conductive compression pads are known in the art. However, to accurately guide optical fiber 20, because of its small diameter, the width of the protrusions 18a, 18b along the z-axis should preferably be no greater than about 1/8 of an inch.

When the first side 16a and second side 16b are coupled together along the pivot axis such that the fiber engaging protrusions 18a, 18b are interleaving, the upper fiber manipulation surfaces 104a, 104b serve to move the optical fiber 20 disposed longitudinally therebetween downward towards the longitudinal grooves 102a, 102b as the apparatus moves from the open state (as shown in FIG. 2) towards the closed state (as shown in FIG. 1). Similarly, the lower fiber manipulation surfaces 106a, 106b serve to move the optical fiber 20 disposed longitudinally therebetween upward towards the longitudinal grooves 102a, 102b as the apparatus moves from the open state towards the closed state. This guiding process is what secures position of the fiber 20 in the x-y plane when the apparatus 10 is in the closed state. Once the apparatus 10 reaches the closed state, the longitudinal grooves 102a, 102b form a single throughbore to completely surround a section of fiber 20. Additionally, it should be noted that the lower fiber manipulation surfaces 106a of the first side 16a always slope towards the lower fiber manipulation surfaces 106b of the second side 16b, and vice versa, such that a section of optical fiber 20 placed thereon will be guided upward by the surfaces 106a, 106b of both sides.

As seen in FIGS. 2, 6, and 7, the positioning of the pivot axis below the fiber engaging protrusions 18a, 18b facilitates the upper members 98a, 98b separating to form a large transverse opening 122 in the x-axis direction relative to the diameter of the optical fiber placed therein. Preferably, the opening 122 has an x-axis dimension of at least 3/16 of an inch or larger. To achieve such an opening size, the pivot axis centerline is preferably located at least 1/4 of an inch below the centerline of the longitudinal grooves 102a, 102b. When either or both of the first and second sides 16a, 16b are fully rotated by applying an inward force on both of the flanges 30a, 30b to overcome the force of the biasing element 85 and the magnetic coupling of the magnetic elements 66a, 66b, the apparatus 10 is positioned in the open state. At this point, the opening 122 is at its largest size and the lower members 100a, 100b are only partially interleaving with each other. To prevent the optical fiber 20 placed longitudinally on the lower members 100a, 100b from being pinched between the lower fiber manipulation surfaces 106a, 106b of the first and second sides 16a, 16b as the apparatus 10 is moved towards the closed state, an included transverse angle α between the surfaces 106a of the first side 16a and the surfaces 106b of the second side 16b is preferably a broad angle greater than about 90 degrees at all times. Such an angle α, depicted in FIG. 6, will ensure that the lower fiber manipulation surfaces 106a, 106b merely push the fiber 20 section upward towards the longitudinal grooves 102a, 102b. Preferably, both of the lower fiber manipulation surfaces 106a, 106b are configured to slope toward the common pivot axis. Additionally, the longitudinal grooves 102a, 102b and fiber engaging protrusions 18a, 18b should span lengthwise along the z-axis for at least 1/2 an inch and preferably 1 1/2 inches or more to properly align the optical fiber 20 section placed therein to facilitate accurate optical measurement and manipulation of the fiber without damaging the fiber section.

By way of use of the apparatus 10, a user will first apply an inward force to the flanges 30a, 30b of the first and second sides 16a, 16b to bring the flanges together below the common pivot axis, thereby moving the first and second faces 46a, 46b away from each other to expose the first and second plurality of fiber engaging protrusions 18a, 18b, as seen in FIGS. 2 and 6. The force applied is typically with the user's fingers, and must be sufficient to overcome the force of the biasing element 85 and the magnetic coupling of the magnetic elements 66a, 66b. Either or both of the flanges 30a, 30b can be rotated about the axis to form the opening 122 for accepting a section of optical fiber 20 therein. The optical fiber 20 must be extended longitudinally between protrusions 18a, 18b at least below the tips 112a, 112b of the upper members 98a, 98b of the protrusions such that the upper and lower fiber manipulation surfaces 104a, 104b, 106a, 106b can properly guide the fiber towards the longitudinal grooves 102a, 102b. If the apparatus 10 is not held vertically upright, the protrusions 18a can still properly guide the optical fiber 20 into position so long as the fiber is positioned closer in towards the longitudinal grooves 102a, 102b than the upper member tips 112a, 112b. Preferably, the user will release the fiber 20 and the weight of gravity will generally position the section of fiber onto the lower fiber manipulation surfaces 106a, 106b, as shown in FIG. 6.

At this point, the user can begin to release the force applied to the flanges 30a, 30b and the biasing element 85 will begin to rotate the flanges away from each other and the first and second faces 46a, 46b towards one another, as seen in FIGS. 6 and 7. The section of optical fiber 20 placed between the protrusions 18a, 18b is then gently and repeatedly urged by either or both of the upper fiber manipulation surfaces 104a, 104b and the lower fiber manipulation surfaces 106a, 106b towards the longitudinal grooves 102a, 102b. If the fiber 20 was dropped onto the lower fiber manipulation surfaces 106a, 106b by the user, then the upward movement of the intersection point of the surfaces will perform the urging of the fiber towards the longitudinal grooves, as seen in FIG. 6. Once the force applied to the flanges 30a, 30b is sufficiently attenuated, the force of the biasing element 85 will bring the apparatus 10 into the fully closed state and the section of fiber 20 positioned within the apparatus will be properly located within the longitudinal grooves 102a, 102b. The grooves 102a, 102b then hold the fiber in place and prevent it from moving laterally along the x-axis and vertically along the y-axis. Various known methods can be used to affix the position of the fiber 20 along the z-axis. At this point, the user can then manipulate the section of fiber 20 extending out of the bore 71 and the nose section 14. For example, the user can extend the nose section 14 into an optical measurement device to analyzing the output of the captured optical fiber 20, or could otherwise couple the apparatus to other devices that use the captured fiber at manufacturing subassembly steps. Additionally, the apparatus 10 can be used within automatic component subassembly processes, including mass production facilities using robotic systems.

It is also to be understood that the apparatus 10 can be configured with longitudinal grooves 102a, 102b having diameters adapted for accepting optical fiber 20 or other cabling that has a diameter larger that bare optical fiber. In such a case, the dimensions of the protrusions may be increased accordingly to properly guide the larger fiber. Further, if the sidewalls 26a, 26b of the first and second sides 16a, 16b extend downward to a y-axis position below axis pin 83 (pivot axis), these walls can be pushed together at a location below the axis such that the lower edges 28a, 28b can be brought together and the apparatus 10 positioned in the open state without the need of flanges 30a, 30b.

From the foregoing information, it should now be obvious that the optical fiber holder apparatus 10 provides a simple, efficient, and accurate solution for aligning a section of optical fiber 20 to allow a user to position and manipulate the section for optical testing measurement, and/or manufacturing subassembly steps. The apparatus 10 uses interleaving fiber engaging protrusions 18a, 18b to repeatedly capture and guide the optical fiber 20 into position without additional user effort. It is also to be understood that the that terms used herein relating to transverse dimensions along the x-axis, vertical dimensions along the y-axis, and longitudinal dimensions along the z-axis are relative, and the system can be rotated in any of the x, y, or z axes such that the dimensional orientations would change accordingly. While certain forms of the present invention have been illustrated and described herein, it is not to be limited to the specific forms or arrangement of parts described and shown.

What is claimed is:

1. An optical fiber holder comprising:
   a first side having a first face and a first plurality of fiber engaging protrusions extending along the first face, the first plurality of fiber engaging protrusions having a longitudinal groove formed therein; and
   a second side having a second face and a second plurality of fiber engaging protrusions extending along the second face, the second plurality of fiber engaging protrusions having a longitudinal groove formed therein, the second side being coupled to the first side along a common axis such that the first plurality of fiber engaging surfaces are interleaving with the second plurality of fiber engaging surfaces;
   wherein the holder is positioned in an open state for accepting an optical fiber onto the first and second plurality of fiber engaging protrusions upon rotation of at least one of the first and second faces along the common axis away from the other face, and transitions into a closed state for alternatively gripping the optical fiber within the longitudinal grooves of the first and second plurality of fiber engaging protrusions upon rotation of at least one of the first and second faces along the common axis towards the other face in a mating relationship.

2. The holder of claim 1, wherein the first plurality of fiber engaging protrusions comprise upper and lower tooth members extending from the first face and the second plurality of fiber engaging protrusions comprise upper and lower tooth members extending from the second face, the longitudinal groove of the first side being formed between the upper and lower tooth members of the first face and the longitudinal groove of the second side being formed between the upper and lower tooth members of the second face.

3. The holder of claim 2, wherein a y-axis distance between the upper and lower tooth members of the first plurality of fiber engaging protrusions narrows from a position adjacent to a first set of fiber engaging protrusion tips towards the first face, and the y-axis distance between the upper and lower tooth members of the second plurality of fiber engaging protrusions narrows from a position adjacent to a second set of fiber engaging protrusion tips towards the second face.

4. The holder of claim 2, wherein the upper and lower tooth members of the first plurality of fiber engaging protrusions define a v-shaped gap therebetween, and the upper and lower tooth members of the second plurality of fiber engaging protrusions define a v-shaped gap therebetween.

5. The holder of claim 2, wherein the lower tooth members of the first side and the second side have flat, fiber manipulation surfaces configured to urge an optical fiber placed thereon towards the longitudinal grooves of the first and second side as the bolder transitions from the open state to the closed state.

6. The holder of claim 5, wherein the fiber manipulation surfaces of the lower tooth members of the first and second sides are configured to slope towards the common axis.

7. The holder of claim 5, wherein an included angle formed between fiber manipulation surfaces of the lower tooth members of first and second side as the holder transitions from an open state to a closed state is greater than 90 degrees.

8. The holder of claim 5, wherein the upper tooth members of the first side and the second side have flat, fiber manipulation surfaces configured to urge an optical fiber placed between such surfaces towards the longitudinal grooves of the first and second side as the holder transitions from the open state to the closed state.

9. The holder of claim 8, wherein the y-axis distance spanned by the fiber manipulation surfaces of the upper tooth members, the longitudinal grooves, and the fiber manipulation surfaces of the lower tooth members is at least $3/16$ inches.

10. The holder of claim 1, wherein both of the first and second sides are rotatable about the common axis.

11. The holder of claim 1, wherein the first plurality of fiber engaging protrusions are alternately, adjacently positioned with respect to the second plurality of fiber engaging protrusions as the holder transitions into the closed state.

12. The holder of claim 1, wherein a biasing force is provided to urge the first and second sides together into the closed state.

13. The holder of claim 10, further comprising a first flange connected to the first side and a second flange connected to the second side whereby a force applied to the first and second flanges to bring the flanges together causes the first and second sides to substantially separate into the open state, and releasing of the flanges causes the first and second sides to move together in the closed state.

14. The holder of claim 1, wherein the first and second sides form a main body member and a nose member extending from a first end of the main body member, the nose member having a transverse dimension smaller than the main body member such that a holder positioned in the closed state presents the nose member for interfacing with an optical measurement device.

15. The holder of claim 1, wherein the y-axis distance between the centerline of the holder common axis and the centerline of the longitudinal grooves of the first and second plurality of fiber engaging protrusions is at least $1/4$ inches.

16. The holder of claim 1, wherein each of the first and second plurality of fiber engaging protrusions comprises at least two protrusions.

17. The holder of claim 1, wherein the first and second sides have a textured outer wall to aid the user in extracting the holder from an optical measurement device.

18. The holder of claim 1, wherein the z-axis dimension of each of the first and second plurality of fiber engaging protrusions does not exceed $1/8$ inches.

19. The holder of claim 1, wherein the first and second plurality of fiber engaging protrusions extend outward from the first and second faces along the x-axis at least $3/32$ inches.

20. The holder of claim 1, wherein a holder opening defined as the x-axis dimension between the upper tooth members of the first and second plurality of fiber engaging protrusions when the holder is in the open state has a transverse width of at least $3/16$ inches.

21. The holder of claim 1, wherein the length along the z-axis of the longitudinal grooves of the first and second plurality of fiber engaging protrusions is at least $1/2$ inches.

22. The holder of claim 1, wherein the length along the z-axis of the longitudinal grooves of the first and second plurality of fiber engaging protrusions is at least $1\frac{1}{2}$ inches.

23. The holder of claim 1, wherein the holder is constructed of material comprising about 20% glass filled polycarbonate.

24. The holder of claim 1, further comprising a magnetic latch for maintaining the first and second sides together in the closed state.

25. The holder of claim 1, further comprising a conductive compression pad to reduce static buildup along a portion of the optical fiber.

26. An optical fiber holder comprising:
    a first side having a first flange and a first plurality of v-shaped fiber engaging surfaces aligned longitudinally along the first side and a first plurality of transverse slots alternately spaced between the fiber engaging surfaces; and
    a second side having a second flange and a second plurality of v-shaped fiber engaging surfaces aligned longitudinally along the second side and a second plurality of transverse slots alternately spaced between the fiber engaging surfaces, the second side being coupled to the first side along a common axis such that the first plurality of v-shaped fiber engaging surfaces are accepted into the second plurality of transverse slots and the second plurality of v-shaped fiber engaging surfaces are accepted into the first plurality of transverse slots;
    wherein a force applied to the first and second flanges to bring flanges together rotates the holder into a substantially open state for accepting an optical fiber between the first and second plurality of v-shaped fiber engaging protrusions, the releasing of the applied force causing the holder to rotate towards a closed state and the first and second plurality of v-shaped fiber engaging protrusions to alternately support the optical fiber longitudinally therebetween, the optical fiber being gripped by the holder in the closed state.

27. The holder of claim 26, wherein the first and second sides are rotatable about the common axis.

28. The holder of claim 26, wherein the first plurality of v-shaped fiber engaging surfaces are alternately, adjacently positioned with respect to the second plurality v-shaped fiber engaging surfaces as the holder transitions into the closed state.

29. The holder of claim 26, wherein the first and second plurality of v-shaped fiber engaging surfaces is at least two each, and the first and second plurality of transverse slots is at least two each.

30. The holder of claim 26, wherein a biasing force is provided to urge the first and second sides together in the closed state.

31. The holder of claim 30, wherein the biasing force is provided by a torsion spring.

32. A method for manipulating an optical fiber, comprising the steps of:
    gripping a pair of flanges of an optical fiber bolder in a closed state;
    applying force to the flanges to open opposing faces of the holder in an open state; and placing an optical fiber between the opposing faces such that a plurality of fiber engaging protrusions of each of the opposing faces continuously grasp a portion of the fiber, without breakage, while releasing the pair of flanges to the closed state.

33. The method of claim 32, wherein the plurality of fiber engaging protrusions of each of the opposing faces are comprised of upper and lower tooth members having a longitudinal groove formed therebetween, and the opposing faces are coupled together along a common pivot axis such that the plurality of fiber engaging protrusions of each of the opposing faces are interleaving with one another.

34. The method of claim 33, wherein the grasping of a portion of the fiber by the plurality of fiber engaging protrusions of each of the opposing faces comprises the lower tooth members contacting the portion of the fiber and urging the portion towards the longitudinal grooves of the first and second plurality of fiber engaging protrusions, the fiber portion having a fixed position in the x-y plane orthogonal to the longitudinal grooves when the holder is in the closed state.

* * * * *

UNITED STATES PATENT AND TRADEMARK OFFICE
CERTIFICATE OF CORRECTION

PATENT NO. : 6,741,786 B2  Page 1 of 1
APPLICATION NO. : 10/097424
DATED : May 25, 2004
INVENTOR(S) : John T. Flower et al.

It is certified that error appears in the above-identified patent and that said Letters Patent is hereby corrected as shown below:

Claim 5, Column 11, Line 7 should read as follows:

and second side as the holder transitions from the open state

Claim 32, Column 12, Line 64 should read as follows:

gripping a pair of flanges of an optical fiber holder in a

Signed and Sealed this

Eighth Day of January, 2008

JON W. DUDAS
*Director of the United States Patent and Trademark Office*